United States Patent [19]

Kumagai

[11] Patent Number: 5,103,487
[45] Date of Patent: Apr. 7, 1992

[54] IMAGE PROCESSING METHOD
[75] Inventor: Ryohei Kumagai, Tokyo, Japan
[73] Assignee: Ezel, Inc., Tokyo, Japan
[21] Appl. No.: 340,697
[22] Filed: Apr. 20, 1989

Related U.S. Application Data

[63] Continuation-in-part of Ser. No. 333,910, Apr. 6, 1989, Pat. No. 5,023,729.

[30] Foreign Application Priority Data

Oct. 25, 1988 [JP] Japan ............................. 63-268908

[51] Int. Cl.$^5$ .............................................. G06K 9/46
[52] U.S. Cl. .......................................... 382/18; 382/28
[58] Field of Search ........................ 382/54, 18, 51, 28; 358/460, 455, 457

[56] References Cited

U.S. PATENT DOCUMENTS 4,665,551  5/1987  Sternberg et al. .................... 382/54

FOREIGN PATENT DOCUMENTS 62-108381  5/1987  Japan ................................. 382/18

OTHER PUBLICATIONS

Mitchell, Myers and Boyne, A Max-Min Measure for Image Texture Analysis, IEEE Transactions on Computers, Apr. 1977, pp. 408-414.

Haralick, Shanmugam and Dinstein, Textural Features for Image Classification, IEE Transactions on Systems, Man, and Cybernetics, vol. SMC-3, No. 6, Nov. 1973, pp. 610-621.

Weszka et al., A Comparative Study of Texture Measures for Terrain Classification, IEEE Transactions on Systems, Man and Cybernetics, vol. SMC-6 No. 4, Apr. 1976.

*Primary Examiner*—Leo H. Boudreau
*Assistant Examiner*—Steven P. Klocinski
*Attorney, Agent, or Firm*—Cushman, Darby & Cushman

[57] ABSTRACT

An image processing method generates a density concurrent matrix. An original image is shifted for generating a shifted image, with pixels in the shifted image corresponding to (conceptually overlapping) pixels in the original image. Bit strings are formed by combining a pixel density value of a pixel from the original image with a density value of a corresponding pixel from the shifted image. In an example, two 4-bit density values are combined into a single 8-bit string. Bit strings formed from pixel pairs are counted to give the number of occurrences of density pairs in the original and shifted image.

13 Claims, 3 Drawing Sheets

IMAGE PROCESSING METHOD

This application is a continuation-in-part of application Ser. No. 07/333,910, filed Apr. 6, 1989, now U.S. Pat. No. 5,023,729.

FIELD OF THE INVENTION

The present invention relates to an image processing method for generating a density concurrent matrix with high process speed.

BACKGROUND OF THE INVENTION

The density concurrent matrix is an important characteristic for texture analysis. In the conventional method, it takes a long time to generate a density concurrent matrix. The density concurrent matrix is a two dimensional expression of the relationship between the density of each pixel and densities of other pixels.

A conventional method is to shift an image by a predetermined distance and then to compare corresponding pixels of the shifted and unshifted images. For this process, much process time is necessary when done by software. A plurality of scans is necessary, at least equal to the number of density levels. When one scan is performed of a video frame, it takes about one second for processing an image of 16 density levels.

SUMMARY OF THE INVENTION

The present invention has an object to provide an image processing method for generating a density concurrent matrix with high process speed.

In the image processing method according to the present invention, a shifted image is generated from the original image, bit strings consisting of densities of corresponding pixels in the shifted and original images are generated, and numbers of pixel pairs are counted for each value of the bit strings.

PREFERRED EMBODIMENTS OF THE PRESENT INVENTION

Exemplary preferred embodiments according to the present invention will be described in detail hereinafter.

Figure 1:
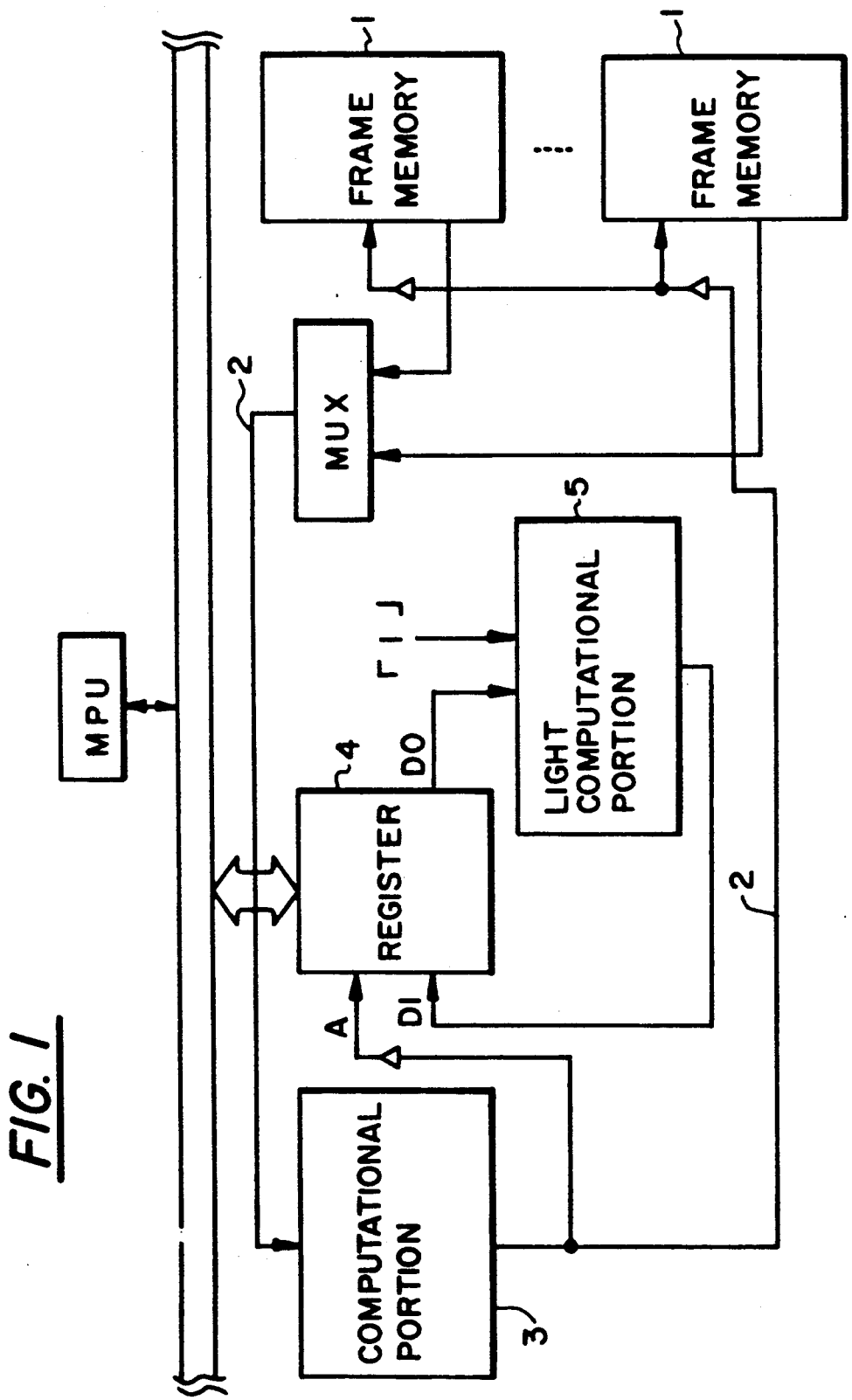
FIG. 1 shows an image processing system used for an image processing method according to the present invention.

FIG. 1 shows an image processing system useful for the embodiment of the present invention. The image processing system comprises a frame memory 1 having a plurality of sections and a computational portion 3 connected through a local bus 2 to the frame memory 1. The computational portion 3 can receive image data from the frame memory 1 and send the computational result to the frame memory 1 or a register 4.

A data output DO of the register 4 is connected to a light computational portion 5. An output of the light computational portion 5 is input to a data input DI of the register 4. An output of the computational portion 3 is connected to an address input A of the register 4 for designating an address of the register 4 according to the computational result of the computational portion 3.

The light computational portion 5 performs a function of increasing by "1" the data from a data output DO of the register 4. The increased data is returned to the data input DI of the register 4. The register accumulates the number of output events from the computational portion 3 for each value of the computational result.

Figure 3:
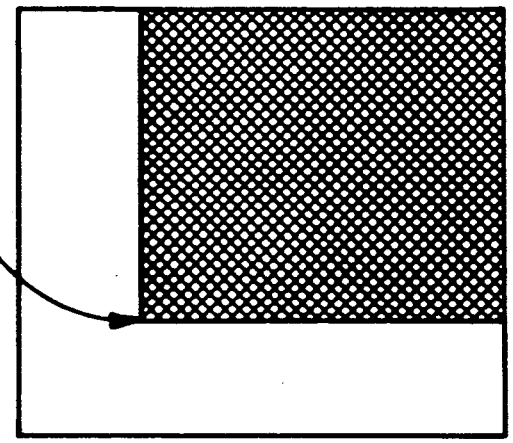
FIG. 3 shows an image shifted from the original image by a predetermined density.
Figure 2:
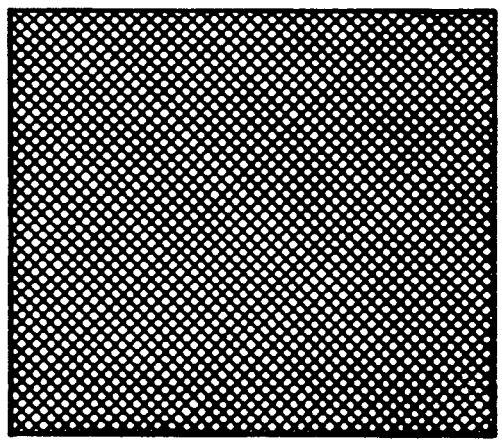
FIG. 2 shows an image to be processed.

An image (FIG. 3) shifted by a predetermined distance (dx, dy) from an original image (FIG. 2) is generated first, for generating a density concurrent matrix. In order to generate the shifted image, the original image is passed through the computational portion 3 without computation, with shifting of the read and write timing of the frame memory. When the write timing is advanced by an amount proportional to a number of pixels, dx in the scan line direction, an image shifted by dx in the x-direction is generated. A shifted image in the y-direction is generated similarly as above. FIG. 3 shows an image shifted by a distance of (dx, dy) from the original image in FIG. 2.

Figure 4:
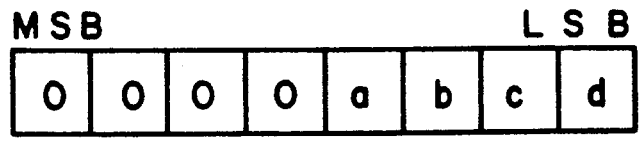
FIG. 4 shows density data of a pixel in the original image.

The original image has been already quantized to be of the gradation levels of a desired density concurrent matrix to be generated. When the number of gradation levels is 16, each pixel has a density with a data length of 4 bits. When the frame memory allocation of each pixel is 8 bits, the lower 4 bits are valid as shown in FIG. 4. The invalid data of the upper 4 bits can be refreshed to "0" by initializing the frame memory before storing the quantized image.

Figure 6:
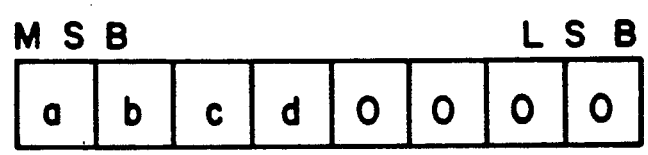
FIG. 6 shows data generated by leftwardly shifting the data in FIG. 4 by 4 bits.

Next, pixel density values of the original image or the shifted image are shifted leftwardly by the length of the data element in the density concurrent matrix; 4 bits. The shifted data is shown in FIG. 6, which consists of 4 upper valid bits (a, b, c and d) and a lower bit string of zeros ("0"). The bit shifting is performed by the computational portion 3 which has a capability of bit shifting or of multiplication by a multiplier of $2^n$.

In this embodiment, the data of the original image is shifted by 4 bits as shown in FIG. 6. The data length of each pixel of the shifted image is equal to the length of the data of the original image (4 bits). The data of the shifted imaged includes valid data in 4 lower bits, the upper 4 bits of which are "0". Since the lower 4 bits of the data of the original image are automatically changed to "0" by bit shifting and the original upper 4 bits are changed to the original lower 4 bits on the bit shifting, the original upper 4 bits may be arbitrary. However, for the example in FIG. 5, the upper 4 bits of the data in FIG. 5 (the shifted image) must be "0".

Figure 5:
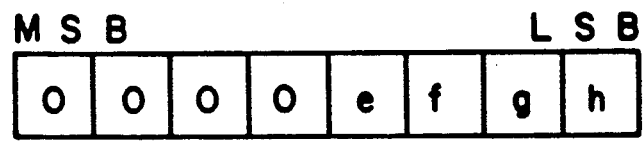
FIG. 5 shows density data of a pixel of the (shifted) image of FIG. 3.
Figure 7:
FIG. 7 shows data generated by adding each bit of the data in FIG. 5 to a corresponding bit of the data in FIG. 6.

The data of the images of FIGS. 5 and 6 are input to the computational portion 3 which calculates addition or OR logic of the data of corresponding pixels of both images. The computation result is a single 8-bit value whose upper 4 bits are the density of a pixel in the original image, and whose lower 4 bits are the density of a corresponding pixel in the shifted image. This result, shown in FIG. 7, is input to the address input A of the register 4. The register 4 is initialized before processing. Data stored in each address of the register 4 finally becomes a count of times each value of the calculation result is output from the computational portion 3.

Stated another way, each address of the register has a most significant 4 bits, corresponding to a density level of the original image (e.g., 1 of 16 values) and a least significant 4 bits corresponding to a density level of the shifted image (e.g., 1 of 16 levels). The value stored in the address is a count of the number of times that the original image has a first density and the corresponding pixel of the shifted image has a second density, for a particular shift distance dx, dy. This set of counts is a density concurrent matrix.

Here the upper 4 bits of the data in FIG. 7 are defined as H1, the lower 4 bits as H2, and the data stored in each address of the register as Cij. The register stores a density concurrent matrix as shown below.

```
              H2
         0    1  ...... 16
     0  C00  C01 ...... C016
     1  C10              .
        .                .
H1      .      Cij       .
        .                .
        .                .
    16  C16,0 ............ C16,16
```

Figure 8:
FIG. 8 shows data generated by shifting the data in FIG. 4 by 1 bit.

In the above embodiment, the computational portion 3 performs a function of bit shifting. When there is a limit to bit shifting, for example the multiplier has a data length of less than 5 bits and shifting by 4 bits is impossible, bit shifting within the limit is performed simultaneously with the coordinate shifting by distance. FIG. 8 shows a density value leftwardly shifted from the data in FIG. 4 by one bit.

As will be understood from the description above, as far as applications where the gradation level is equal to or less than one-half the length allowed for data in the frame memory, the density concurrent matrix is generated by 2 scans; one scan for coordinate shifting and one scan for bit shifting and combination. This scanning time is much smaller than the conventional method which needs scanning times of (1+m), where m is gradation levels. Therefore, the processing time length is 1/m of the conventional method.

The image processing system for the present invention is not limited to the system in FIG. 1. A system capable of addition or an OR logic function, as well as registering performance for counting each value of a computational result may be used.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modifications are intended to be included within the scope of this invention as defined in the following claims.

What is claimed is:

1. An image processing method for determining the texture of an original image comprising steps of:
    storing density values of pixels of the original image in a first electronic memory in a manner which preserves information regarding the spatial locations of pixels within the image;
    generating a shifted image by copying density values of pixels of the original image such that each pixel in the original image corresponds to a pixel in the shifted image which was taken from a spatially shifted location within the original image;
    generating bit sequences, each bit sequence consisting of a density value of a pixel from said original image and a density value of a corresponding pixel from said shifted image;
    generating a concurrent density matrix by counting numbers of occurrences of said bit sequences; and
    determining texture of the original image from the concurrent density matrix.

2. An image processing method according to claim 1, wherein the step of generating bit sequences includes steps of:
    forming a first bit sequence having an invalid part and having a valid part comprising density data of a pixel of the original image;
    forming a second bit sequence having an invalid part and having a valid part comprising density data of a corresponding pixel of the shifted image;
    shifting one of said bit sequences so that the valid part of one of said first and second sequences occupies a portion of its sequence corresponding to the invalid part of the other sequence; and
    combining said first and second sequences.

3. An image processing method according to claim 2 wherein said step of shifting one of said bit sequences includes a step of shifting a bit sequence formed of pixel data from the original image.

4. An image processing method according to claim 3, wherein said step of shifting one of said bit sequences is performed at least partially concurrently with said step of generating a shifted image.

5. An image processing method according to claim 2 wherein said step of combining first and second sequences includes a step of concatenating said first and second sequences.

6. An image processing method according to claim 2 wherein said step of combining first and second sequences includes a step of performing a logical OR function of said first and second sequences.

7. An apparatus for determining texture of an original image comprising:
    first memory means for storing pixel density values of the original image;
    second memory means for storing pixel density values of a shifted image;
    image shifting means for reading the first memory and writing pixel density values into the second memory means with read/write timing shifted relative to timing of the first memory means, thereby generating a shifted image;
    sequence generation means for generating bit sequences, each bit sequence consisting of density data of a pixel from said original image and density data of a corresponding pixel from said shifted image;
    counting means for counting numbers of occurrences of said bit sequences, and
    third memory means for storing counted number of occurrences, thereby generating a concurrent density matrix indicating the texture of the original image.

8. An apparatus according to claim 7 wherein said sequence generation means includes means for concatenating sequences.

9. An apparatus according to claim 7 wherein said sequence generation means includes means for performing the logical OR function on two sequences.

10. An apparatus according to claim 7 wherein said counting means includes register means connected to said sequence generation means for accumulating a number of occurrences of a sequence generated by the sequence generating means.

11. An apparatus according to claim 10 wherein said counting means further includes means to increment a value stored in the register with each occurrence of a sequence.

12. An apparatus according to claim 7 wherein said sequence generating means includes:
   means for forming a first bit sequence having an invalid part and having a valid part comprising density data of a pixel of the original image;
   means for forming a second bit sequence having an invalid part and having a valid part comprising density data of a corresponding pixel of the shifted image;
   means for shifting one of said bit sequence so that the valid part of one of said first and second sequences occupies a portion of its sequence corresponding to the invalid part of the other sequence; and
   means for combining said first and second sequences.

13. A method for determining the texture of an original image comprising steps of:
   storing pixel density values of an original image;
   shifting the density values of the original image to form a shifted image such that pixel values of the original image correspond with values of the shifted image;
   generating bit sequences, a first portion of a bit sequence representing the density value of a pixel in he shifted image and a second portion of the bit sequence representing a density value of a corresponding pixel in the original image; and
   counting the number of occurrences of identical bit sequences, and
   determining the texture of the original image from said counting step.

* * * * *